United States Patent [19] [11] 4,342,085

Glickman et al. [45] Jul. 27, 1982

[54] STEM PROCESSING FOR DATA REDUCTION IN A DICTIONARY STORAGE FILE

[75] Inventors: David Glickman, Frederick, Md.; Evon C. Greanias, Chappaqua, N.Y.; James T. Repass, Gaithersburg; Walter S. Rosenbaum, Bethesda, both of Md.

[73] Assignee: International Business Machines Corporation, Armonk, N.Y.

[21] Appl. No.: 1,123

[22] Filed: Jan. 5, 1979

[51] Int. Cl.$^3$ .......................... G06F 5/00; G06F 11/00

[52] U.S. Cl. ...................................... 364/300; 364/200

[58] Field of Search ... 364/200 MS File, 900 MS File, 364/300

[56] References Cited

U.S. PATENT DOCUMENTS 3,311,893 3/1967 Landell ................................ 364/900

4,034,350 7/1977 Kashio ................................ 364/900

*Primary Examiner*—Gareth D. Shaw

*Assistant Examiner*—David Y. Eng

*Attorney, Agent, or Firm*—John W. Henderson, Jr.

[57] ABSTRACT

A system for reducing storage requirements and accessing times in a text processing machine for automatic spelling verification and hyphenation functions. The system includes a method for storing a word list file and accessing the word list file such that legal prefixes and suffixes are truncated and only the unique root element, or "stem", of a word is stored. A set of unique rules is provided for prefix/suffix removal during compilation of the word list file and subsequent accessing of the word list file. Spelling verification is accomplished by applying the rules to the words whose spelling is to be verified and application of the said rules provides, under most circumstances, a natural hyphenation break point at the prefix-stem and stem-suffix junctions.

11 Claims, 2 Drawing Figures

INPUT WORD
20
1
22
NO
SUFFIX ?
YES
24
REMOVE SUFFIX (ES)
26
SET F1
2
28
NO
PREFIX ?
YES
30
REMOVE PREFIX (ES)
SET F2
32
3
34
NO
WORD IN DICTIONARY ?
YES
4
5
36
WORD FOUND
5
38
NO
6
F1 & F2 SET ?
YES
40
REINSTATE PREFIX (ES)
42
WORD IN DICTIONARY ?
YES
4
NO
44
REMOVE PREFIX (ES)
46
REINSTATE SUFFIX (ES)
CLR F1
47
48
WORD IN DICTIONARY ?
YES
4
NO
6
50
8
NO
F1 OR F2 SET ?
YES
52
REINSTATE PREFIX (ES) OR SUFFIX (ES)
7
7
54
WORD IN DICTIONARY ?
YES
4
NO
8
56
WORD FOUND

STEM PROCESSING FOR DATA REDUCTION IN A DICTIONARY STORAGE FILE

BACKGROUND OF THE INVENTION

1. Field of the Invention

This invention relates to text processing and more particularly to methods for reducing the storage required to store a dictionary of text words.

2. Description of the Prior Art

In implementing a practical automatic spelling verification or hyphenation system, the ultimate number of entries in the dictionary storage file is a very important factor which affects the practicality of the system in terms of both cost and efficiency of operation. Procedures have evolved in the prior art for reducing the size of storage files. One of the procedures requires that entries in the storage file that are not being used, or that are used least, be eliminated.

A second procedure for reducing file size requires the compaction of the data in the file by run-length encoding the characters and symbols by replacing a string of identical characters with an identifier and a count.

A third procedure for reducing file size requires substituting more efficient codes for those commonly used, for example, substituting Huffman codes for fixed byte codes wherein characters that occur more frequently are represented by fewer bits than those which occur infrequently. This technique can be enhanced by grouping together various sets of characters having similar occurrence properties.

A fourth procedure for reducing the storage file size requires substituting a vector representation of a magnitude and unique angle for each word in the dictionary file where common magnitudes are run-length encoded with the corresponding angles. The theory behind the file size reduction of this technique is that less storage space is required to store the magnitude and angle representation of a word than is required to store the characters of the average length word. The run-length encoding of the magnitudes provides an enhancement to this technique.

However, a major element of dictionary content which causes a word list file to ballon in size in the multiplicity of forms a root word may take on due to prefixes and suffixes. This problem has not been addressed in the prior art.

SUMMARY OF THE INVENTION

It has been discovered that improved data compaction in a dictionary file for automatic spelling verification and hyphenation is achievable by providing a technique to remove prefixes and suffixes from the word and storing only the unique root or stem form of each word. This technique is useful as an enhancement to any of the known storage reduction techniques, including run-length encoding, Huffman coding, and vector representations, because it reduces the number of file entries required while the other techniques reduce the storage size of each entry. The stem processing system includes a build function in which the dictionary file is compiled and a retrieval function in which the dictionary file is accessed. Both functions have in common a list of legal prefixes and suffixes. Each prefix and suffix in the list has associated with it a set of coded rules which govern under what textural circumstances the prefixes and suffixes are searched.

DESCRIPTION OF THE PREFERRED EMBODIMENT

Figure 1:
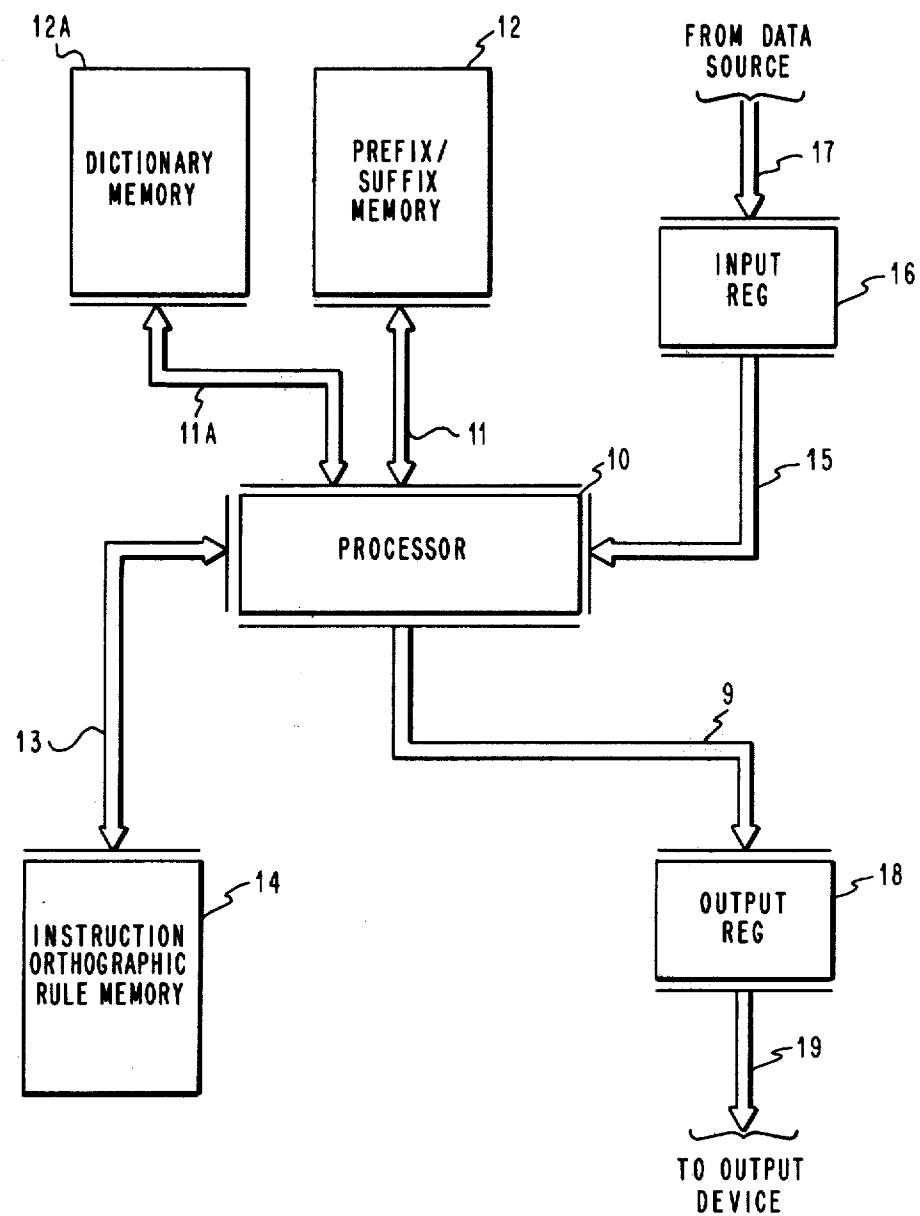
FIG. 1 is a block diagram of some components in the text processing system.

Referring to FIG. 1 there is shown a block diagram of a text processing system which includes a processor or CPU 10 of the general purpose type which is capable of decoding and executing instructions. The processor 10 is in two-way communication over bus 13 with a memory 14 containing instructions which control its operation and define the present invention. The processor 10 is also in two-way communication over bus 11 with memory 12 which contains the list of legal prefixes and suffixes associated with the instructions stored in instruction memory 14 and in two-way communication with dictionary memory 12A over bus 11A wherein the roots or stems of a predetermined dictionary of words are stored. The instruction memory 14, prefix/suffix memory 12, and dictionary 12A may all be of the read only storage or random access storage type.

An input register 16 receives text words from a source (not shown) over bus 17. The source may be any of various input devices including keyboards, magnetic tape readers, magnetic card readers, disc files, etc. Text words are presented to processor 10 by register 16 over bus 15 for processing in accordance with the instructions stored in instruction memory 14. An output register 18 receives signals from processor 10 over bus 9 indicative of the results of the processing operation performed on the contents of input register 16. Signals stored in the output register 18 are made available over bus 19 to utilization devices which may take any of various forms, including a display having means for highlighting a word displayed thereon, a printer having means for ringing a bell or repositioning a print element at the beginning of a word just printed, etc.

The preferred embodiment of the present invention comprises a set of instructions or programs for controlling the text processing system of FIG. 1 to produce a dictionary of text words for storage in dictionary memory 12A by truncating all legal prefixes and suffixes from the words. The produced dictionary of text words is then accessed to verify the correct spelling of input words received in input register 16 during normal word processing operations such as input keying. The process also produces potential hyphenation break points at the prefix-stem and stem-suffix junctions. The input words are processed by processor 10 under control of the instructions of this invention to remove legal prefixes and suffixes before comparison to the contents of dictionary memory 12A.

Since the programs for accessing the dictionary memory must necessarily include the same rules as the programs for producing the set of text words stored in the dictionary memory, the remainder of the specification will be devoted to defining the rules of operation in the context of automatically verifying the correctness of the spelling of words received at input register 16. A list of predefined legal prefixes is shown in Table I. This list is not proported to be all inclusive but is merely presented as exemplary. A first constraint on prefix processing is that the prefix list be processed in order of descending length such that the longer prefixes that contain the same characters as shorter prefixes are compared to the input word first. For example, "inter" must be compared to the input word before "in".

TABLE I

| Prefix List | | | | |
|---|---|---|---|---|
| COUNTER | CROSS | ANTI | ANY | DE |
| | INTER | BACK | DIS | EN |
| | INTRA | DOWN | MIS | IN |
| | MACRO | FORE | NON | RE |
| | MICRO | KILO | OUT | UN |
| | MILLI | MEGA | PRE | UP |
| | MULTI | MINI | PRO | |
| | SUPER | OVER | SUB | |
| | TRANS | SEMI | | |
| | UNDER | SOME | | |
| | | TELE | | |

The second constraint on prefix processing is that the input word must have a minimum number of characters, N, excluding the prefix to qualify as a legitimate root or stem. The defined minimum word length in the preferred embodiment of this invention is N equals three characters. In operation, an initial check is made to determine if the input word meets minimum requirements for prefix processing. Since the shortest prefix, P, in Table I contains two characters, the word must have at least N plus P equal five characters to pass the initial test for prefix processing.

A third constraint on the preferred embodiment of the prefix processing routine of this invention is that the first character of the input word by alphabetic. If the first character of the word is non-alphabetic, the word is flagged and cannot be processed under the prefix processing rules. This initial prefix preprocessing is performed by the program routine listed in Table II.

TABLE II

Prefix Preprocessor Subroutine

```
BEGINSEGMENT(SVEPPS)
ENTER PPS, SAVE THE LINKAGE REGISTER:
IF
WORD IS LONG ENOUGH FOR A PREFIX
THEN
GET THE PREFIX LIST ADDRESS:
GET THE FIRST LETTER IN THE WORD;
IF
THIS IS A NON-ALPHABETIC VALUE
THEN
FLAG AS NO PREFIX PROCESSING;
ENDIF:
POINT TO PREFIX LIST POINTER FOR THE
FIRST LETTER IN THE WORD;
GET THE PREFIX LIST POINTER FOR THE
FIRST LETTER IN THE WORD;
INITIALIZE PREFIX CHECK WHILE-DO;
WHILE
MORE PREFIX ENTRIES EXIST
DO
CHECK NEXT PREFIX LIST ENTRY;
BEGIN
COMPUTE MINIMUM WORD SIZE;
IF
WORD LONG ENOUGH FOR PREFIX
THEN
CALL (SVRPCS)
TO STEM PROCESS A PREFIX;
ELSE
POINT TO NEXT PREFIX ENTRY;
ENDIF;
END;
ENDWHILE;
ENDIF;
RETURN
(TO CALLER WITH PREFIX STEM RESULT);
```

TABLE II-continued

Prefix Preprocessor Subroutine

```
ENDSEGMENT(SVRPPS);
```

If the input word meets the test of having the minimum required number of characters and beginning with an alphabet, then it is compared to those prefixes in the prefix memory 12 whose length P plus N is not greater than the length of the input word. For example, if the input word contains six characters, then only those prefixes having three characters or less are compared to the input word. Table III shows the program routine from instruction memory 14 for comparing the prefixes in prefix memory 12 whose length qualify to the input word in input register 16. If a compared prefix in the prefix memory 12 matches the beginning characters of the input word, then the beginning address of the input word is modified to remove the prefix and the prefix length is stored as a hyphenation point for the word. This completes prefix processing.

TABLE III

Prefix Check Subroutine

```
BEGINSEGMENT(SVRPCS)
ENTER PCS;
GET WORD START ADDRESS;
GET PREFIX ENTRY LENGTH;
WHILE
PREFIX IS NOT FULLY MATCHED AND NO
CHARACTERS MISMATCH
DO
POINT TO NEXT WORD LETTER;
POINT TO NEXT LIST PREFIX LETTER;
GET THE LIST PREFIX LETTER;
GET THE WORD LETTER;
COMPARE THE TWO TO EACH OTHER;
ENDWHILE;
IF
ALL CHARACTERS MATCHED BETWEEN THE
LIST PREFIX AND THE CANDIDATE WORD
THEN
SAVE PREFIX-LENGTH FOR HYPHENATION;
GET THE PREFIX LENGTH;
UPDATE WORD START ADDRESS TO REFLECT
PREFIX STEM PROCESSING;
UPDATE WORD LENGTH ALSO TO REFLECT
PREFIX STEM PROCESSING;
FLAG WORD AS BEING PREFIX PROCESSED;
FLAG AS END OF PREFIX SEARCH;
ELSE
ADJUST PREFIX LIST POINTER TO POINT
TO THE NEXT PREFIX TO BE TRIED;
GET NEXT LIST ENTRY BYTE TO TEST
FOR END OF PREFIX LIST;
ENDIF;
RETURN
(TO SVRPPS WITH PREFIX STEM RESULT);
ENDSEGMENT(SVRPCS);
```

The instruction memory 14 also contains routines for truncating suffixes from the input word received by input register 16 under control of processor 10. Table IV is a program listing of the suffix preprocessor subroutine. The suffix preprocessor subroutine processes apostrophe and "S" suffixes and calls the word ending reconstruction subroutine listed in Table VIII.

TABLE IV

Suffix Preprocessor Subroutine

```
BEGINSEGMENT(SVRSPS)
ENDTEXT;
ENTER SPS, SAVE THE LINKAGE REGISTER;
NOTE
ALL SUFFIX PROCESSING IS PREDICATED
```

TABLE IV-continued

| Suffix Preprocessor Subroutine |
|---|
| ON THE WORD BEING LONG ENOUGH TO HAVE A USEABLE STEM; |
| IF |
| WORD IS LONG ENOUGH FOR ---' |
| THEN |
| POINT TO LAST CHARACTER IN WORD; |
| IF |
| LAST CHARACTER IS APOSTROPHE |
| THEN |
| GET APOSTROPHE SUFFIX LIST; |
| CALL (SVRSTS) |
| TO TRY TO SUFFIX PROCESS WORD; |
| ENDIF; |
| IF |
| WORD IS NOW LONG ENOUGH FOR ---S |
| THEN |
| POINT TO LAST CHARACTER IN WORD; |
| IF |
| LAST CHARACTER IS THE LETTER S |
| THEN |
| GET 'S' SUFFIX LIST; |
| CALL (SVRSTS) |
| TO TRY TO SUFFIX PROCESS WORD: |
| ENDIF; |
| IF |
| WORD IS STILL LONG ENOUGH TO SUPPORT ---ED or ---AL |
| THEN |
| POINT TO LAST CHARACTER IN WORD; |
| IF |
| LAST CHARACTER IS THE LETTER D |
| THEN |
| CALL (SVRS1S) |
| TO CHECK REST OF SUFFIX; |
| ELSE |
| IF |
| THE LAST LETTER IS LETTER L |
| THEN |
| CALL (SVRS2S) |
| TO CHECK REST OF SUFFIX; |
| ELSE |
| NOTE |
| THE SUFFIXES -ING, -ION, -ALLY ARE GOING TO BE CHECKED HERE ALTHOUGH THEIR LENGTH REQUIREMENTS WILL BE CHECKED IN THEIR RESPECTIVE SUBROUTINES; |
| IF |
| THE LAST LETTER IS G |
| THEN |
| CALL (SVRS3S) |
| TO CHECK REST OF SUFFIX: |
| ELSE |
| IF |
| THE LAST LETTER IS N |
| THEN |
| CALL (SVRS4S) |
| TO CHECK SUFFIX MORE; |
| ELSE |
| IF |
| THE LAST LETTER IS Y |
| THEN |
| CALL (SVRS5S) |
| TO CHECK SUFFIX; |
| ENDIF; |
| ENDIF; |
| ENDIF; |
| ENDIF; |
| ENDIF; |
| ENDIF; |
| ENDIF; |
| ENDIF; |
| IF |
| THE SUFFIX HAS MULTIPLE VARIANTS |
| THEN |
| ADJUST THE CASE COUNT TO ALLOW ANOTHER PASS THROUGH THE ALGORITHMS WITH AN ALTERNATE VARIATION OF THE SUFFIX STEM IF THE PRESENT ONE DOES NOT VERIFY IN THE DRM; |
| ENDIF; |
| RETURN |
| (TO CALLER WITH SUFFIX STEM RESULT); |
| ENDSEGMENT(SVRSPS); |

TABLE V

| Suffix Lists | | |
|---|---|---|
| (1) XXX' | - | APOSTROPHE |
| (2) XXXS | - | S |
| (3) XXXED | - | ED |
| (4) XXXAL | - | AL |
| (5) XXXING | - | ING |
| (6) XXXION | - | ION |
| (7) XXXALLY | - | ALLY |

Table V contains an exemplary list of legal suffixes which are stored in the prefix/suffix memory 12. The suffix processing rules also include the constraint that the word length N be at least three characters excluding the suffix. The suffix preprocessor subroutine makes a preliminary check of each of the assigned legal suffixes against the input word to determine if its length N is sufficient to contain the requisite number of characters plus the suffix. The result of this character check causes the suffix subroutine to be branched to which is identified as being equal to the word ending. The subroutine for processing each of the defined legal suffixes other than apostrophe and "S" are listed in Table VI.

TABLE VI

| Suffix Processor Subroutines |
|---|
| BEGINSEGMENT(SVRS1S) |
| ENTER S1S; |
| GET THE NEXT TO LAST LETTER IN WORD; |
| IF |
| THE CHARACTER IS LETTER E |
| THEN |
| GET "ED" SUFFIX LIST; |
| CALL (SVRSTS) |
| TO TRY TO SUFFIX PROCESS THE WORD; |
| ENDIF; |
| RETURN |
| (TO SVRSPS WITH SUFFIX STEM RESULT); |
| ENDSEGMENT(SVRS1S); |
| BEGINSEGMENT(SVRS2S) |
| ENTER S2S; |
| GET THE NEXT TO LAST LETTER IN WORD; |
| IF |
| THE CHARACTER IS LETTER A |
| THEN |
| GET "AL" SUFFIX LIST; |
| CALL (SVRSTS) |
| TO TRY TO SUFFIX PROCESS THE WORD; |
| ENDIF; |
| RETURN |
| (TO SVRSPS WITH SUFFIX STEM RESULT); |
| ENDSEGMENT (SVRS2S); |
| BEGINSEGMENT(SVRS3S) |
| ENTER S3S; |
| IF WORD IS LONG ENOUGH FOR ---ING |
| THEN |
| GET NEXT TO LAST CHARACTER IN WORD; |
| IF |
| THE CHARACTER IS THE LETTER N |
| THEN |
| GET NEXT PRECEDING LETTER IN WORD; |
| IF |
| THE CHARACTER IS THE LETTER I |
| THEN |
| GET "ING" SUFFIX LIST; |
| CALL (SVRSTS) |
| TO TRY SUFFIX PROCESSING WORD; |
| ENDIF; |

TABLE VI-continued

Suffix Processor Subroutines

```
ENDIF;
ENDIF;
RETURN
(TO SVRSPS WITH SUFFIX STEM RESULT);
ENDSEGMENT(SVRS3S);
          BEGINSEGMENT(SVRS4S)
ENTER S4S;
IF
WORD IS LONG ENOUGH FOR ---ION
THEN
GET NEXT TO LAST CHARACTER IN WORD;
IF
THE CHARACTER IS THE LETTER O
THEN
GET NEXT PRECEDING LETTER IN WORD;
IF
THE CHARACTER IS THE LETTER I
THEN
GET "ING" SUFFIX LIST;
CALL (SVRSTS)
TO TRY SUFFIX PROCESSING WORD;
ENDIF;
ENDIF;
ENDIF;
RETURN
(TO SVRSPS WITH SUFFIX STEM RESULT);
ENDSEGMENT(SVRS4S);
          BEGINSEGMENT(SVRS5S)
ENTER S5S;
IF
WORD IS LONG ENOUGH FOR ---ALLY
THEN
GET NEXT TO LAST CHARACTER IN WORD;
IF
THE CHARACTER IS THE LETTER L
THEN
GET NEXT PRECEDING LETTER IN WORD;
IF
THE CHARACTER IS THE LETTER L
THEN
GET NEXT PRECEDING LETTER;
IF
THE CHARACTER IS THE LETTER A
THEN
GET "ALLY" SUFFIX LIST;
CALL (SVRSTS)
TO SUFFIX PROCESSING WORD;
ENDIF;
ENDIF;
ENDIF;
ENDIF;
RETURN
(TO SVRSPS WITH SUFFIX STEM RESULT);
ENDSEGMENT(SVRS5S);
          BEGINSEGMENT(SVRSSS)
ENTER SSS, SAVE THE LINKAGE REGISTER;
IF
THE WORD UNDER TEST IS LONG ENOUGH
TO PERFORM PLURAL/POSSESSIVE CHECKS
THEN
POINT TO LAST CHARACTER IN WORD;
IF
THE LAST CHARACTER IN THE WORD IS
THE LETTER S OR AN APOSTROPHE
THEN
IF
LAST LETTER IN THE WORD IS S
THEN
ADJUST NEW-WORD-END POINTER;
IF
NEXT TO LAST CHARACTER IN
THE WORD IS AN APOSTROPHE
THEN
ADJUST NEW-WORD-END POINTER;
ENDIF;
ENDIF;
COMPUTE TRUE WORD END ADDRESS;
SUBTRACT NEW-WORD-END ADDRESS;
SAVE REMOVEABLE SUFFIX LENGTH;
CALL (SVRCSS)
TO CHECK FOR USEABLE SUFFIX;
NOTE
THE CONTENTS OF R12 RETURNED
WILL DETERMINE THE NUMBER OF
CHARACTERS (0 OR 1 OR 2) TO BE
REMOVED FROM THE TESTED WORD;
DECREMENT WORD LENGTH BY PLURAL/
POSSESSIVE REMOVAL, IF ANY;
ENDIF;
ENDIF;
RETURN
(TO CALLER WITH PLURALS PROCESSED);
ENDSEGMENT(SVRSSS);
```

Each of the defined suffixes has associated with it a set of rules which define the reconstruction of the stem word ending following removal of the suffix. These reconstruction rules are listed in Table VII. The program subroutines for executing the stem word ending reconstruction are listed in Table VIII.

TABLE VII

Word Ending Reconstruction Rules

The following suffix rules for each suffix list are attempted sequentially.

# = ANY CONSONANT
$ = ANY VOWEL
¢ = ANY LETTER

| | | | |
|---|---|---|---|
| (1) | SUFFIX XXX' | | |
| | S' | →→ | S |
| (2) | SUFFIX XXXS | | |
| | #IES | →→ | #Y |
| | CHES | →→ | CH |
| | SHES | →→ | SH |
| | SSES | →→ | SS |
| | #SES | →→ | #SE |
| | XES | →→ | X |
| | ¢'S | →→ | ¢ |
| | FS | →→ | FS |
| | JS | →→ | JS |
| | QS | →→ | QS |
| | SS | →→ | SS |
| | US | →→ | US |
| | XS | →→ | XS |
| | ZS | →→ | ZS |
| | OES | →→ | OES |
| | CHS | →→ | CHS |
| | SHS | →→ | SHS |
| | #OS | →→ | #OS |
| | #YS | →→ | #YS |
| | ¢S | →→ | ¢ |
| (3) | SUFFIX XXXED | | |
| | IED | →→ | Y or I |
| | $YED | →→ | $Y |
| | FERED | →→ | FERED |
| | ERED | →→ | ER |
| | ORED | →→ | OR |
| | ENED | →→ | EN |
| | EED | →→ | EE |
| | AED | →→ | A |
| | HED | →→ | H |
| | WED | →→ | W |
| | OED | →→ | O or OE |
| | UED | →→ | UE |
| | XED | →→ | X |
| | $C#ED | →→ | $CK or $C |
| | #$#ED | →→ | #$#E |
| | QU$#ED | →→ | QU$#E |
| | #ED | →→ | # or #E |
| (4) | SUFFIX XXXAL | | |
| | CAL | →→ | C |
| | IAL | →→ | Y |
| | HAL | →→ | H |
| | XAL | →→ | X |
| | SAL | →→ | SE |
| | UAL | →→ | UE |
| | VAL | →→ | VE |
| | QAL | →→ | QAL |
| | $#AL | →→ | $#E or $# |

TABLE VII-continued

| Word Ending Reconstruction Rules | | | |
|---|---|---|---|
| | #LAL | →→ | #LE or #L |
| | ##AL | →→ | ## |
| (5) | SUFFIX XXXING | | |
| | FERING | →→ | FERING |
| | ERING | →→ | ER |
| | ORING | →→ | OR |
| | ENING | →→ | EN |
| | HING | →→ | H |
| | UING | →→ | UE |
| | XING | →→ | X |
| | WING | →→ | W |
| | UEING | →→ | UEING |
| | #EING | →→ | #EING |
| | $ING | →→ | $ |
| | CKING | →→ | CK or C |
| | #$#ING | →→ | #$#E |
| | QU$#ING | →→ | QU$#E |
| | #ING | →→ | # or #E |
| (6) | SUFFIX XXXION | | |
| | XION | →→ | X |
| | CION | →→ | CION |
| | ##ION | →→ | ## |
| | $#ION | →→ | $#E |
| (7) | SUFFIX XXXALLY | | |
| | CALLY | →→ | C |
| | IALLY | →→ | Y |
| | HALLY | →→ | H |
| | XALLY | →→ | X |
| | SALLY | →→ | SE |
| | UALLY | →→ | UE |
| | VALLY | →→ | VE |
| | QALLY | →→ | QALLY |
| | $#ALLY | →→ | $#E or $# |
| | #LALLY | →→ | #LE or #L |
| | ##ALLY | →→ | ## |

TABLE VIII

Word Ending Reconstruction Subroutines

```
BEGINSEGMENT(SVRCSS)
ENTER CSS;
IF
FIRST LETTER IN IS A D
THEN
POINT TO NEXT LETTER INWARD;
IF
NEXT LETTER IN IS NOT AN E
THEN
FLAG AS NO-SUFFIX-MATCH;
ENDIF;
ELSE
IF
FIRST LETTER IN IS AN L
THEN
POINT TO NEXT LETTER INWARD;
IF
NEXT LETTER IN IS NOT AN A
THEN
FLAG AS NO-SUFFIX-MATCH;
ENDIF;
ELSE
FLAG AS NO-SUFFIX-MATCH;
ENDIF;
ELSE
IF
FIRST LETTER IN IS A G
THEN
POINT TO NEXT LETTER INWARD;
IF
NEXT LETTER IN IS AN N
THEN
FLAG AS NO-SUFFIX-MATCH;
ENDIF;
ELSE
IF
FIRST LETTER IN IS AN N
THEN
POINT TO NEXT LETTER INWARD;
IF
```

TABLE VIII-continued

Word Ending Reconstruction Subroutines

```
NEXT LETTER IN IS AN O
THEN
POINT TO NEXT LETTER INWARD;
IF
NEXT LETTER IN IS NOT AN I
THEN
FLAG AS NO-SUFFIX-MATCH;
ENDIF;
ELSE
FLAG AS NO-SUFFIX-MATCH:
ENDIF;
ELSE
FLAG AS NO-SUFFIX-MATCH;
ENDIF;
ENDIF;
ENDIF;
ENDIF;
IF
PLURAL/POSSESSIVE CAN BE REMOVED
THEN
IF
THE WORD WAS NOT YET TESTED WITH
THE PLURAL/POSSESSIVE REMOVED;
THEN
FLAG AS TESTING WORD WITH THE
THE PLURAL/POSSESSIVE REMOVED;
DECREMENT CASE NUMBER TO ALLOW
RETEST WITH PLURAL/POSSESSIVE;
ELSE
RESTORE FLAG FOR FULL SUFFIX TEST;
ENDIF;
ENDIF;
RETURN
(TO SVRSSS WITH SUFFIX TEST RESULT);
ENDSEGMENT(SVRCSS);
BEGINSEGMENT(SVRSTS)
ENTER STS, SAVE THE CALLER ADDRESS;
POINT TO WORD END LESS THE SUFFIX;
GET FIRST SUFFIX LIST ENTRY;
REPEAT
TRY TO MATCH THE ROOT WORD TO ONE OF
THE SUFFIX STEM PROCESSING RULES
TO ALLOW SUFFIX REMOVAL;
BEGIN
IF
THE SUFFIX RULE BEING CHECKED IS
NOT A MULTIPLE STEM CONTINUATION
THEN
SAVE THE SUFFIX RULE LENGTH;
IF
WORD LONG ENOUGH FOR THE RULE
THEN
INITIALIZE STEM MATCH FLAG;
GET SUFFIX RULE ENTRY END;
POINT TO THE WORD STEM END;
REPEAT
CHECK EACH CHARACTER IN THE
RULE AND IN WORD TO FIND
OUT IF THIS RULE IS VALID;
CALL (SVRSMS)
TO DO THE ACTUAL CHECKING;
UNTIL
SUFFIX LIST ENTRY EXHAUSTED
WITH NO MISMATCH IN THE WORD
ENREPEAT;
ENDIF;
ENDIF;
IF
SUFFIX LIST RULE IS APPLICABLE
THEN
FLAG WORD AS HAVING A SUFFIX:
CALL (SVRFSS)
TO SUFFIX PROCESS THE WORD;
ELSE
POINT TO NEXT SUFFIX LIST ENTRY:
GET NEXT SUFFIX RULE:
ENDIF;
END;
UNTIL
SUFFIX STEM MATCHES SUFFIX LIST OR
END OF SUFFIX LIST IS REACHED
```

TABLE VIII-continued

Word Ending Reconstruction Subroutines

```
ENDREPEAT;
RETURN
(TO CALLER WITH SUFFIX TEST RESULT);
ENDSEGMENT(SVRSTS);
          BEGINSEGMENT(SVRSMS)
ENTER SMS;
IF
LIST ENTRY CHARACTER IS A GENERIC
SYMBOL OF VOWEL OR CONSONANT
THEN
IF
WORD CHARACTER IS A CONSONANT
THEN
IF
LIST ENTRY IS A GENERIC VOWEL
THEN
FLAG AS CHARACTER MISMATCH;
ENDIF;
ELSE
IF
LIST ENTRY IS GENERIC CONSONANT
THEN
FLAG AS CHARACTER MISMATCH;
ENDIF;
ENDIF;
ELSE
SAVE LIST ENTRY CHARACTER;
IF
THE LIST ENTRY CHARACTER DOES NOT
MATCH CORRESPONDING WORD CHARACTER
THEN
FLAG AS CHARACTER MISMATCH;
ENDIF;
ENDIF;
UPDATE LIST AND WORD POINTERS TO POINT
TO NEXT CHARACTERS TO BE CHECKED;
RETURN
(TO SVRSTS WITH LIST MATCH RESULT);
ENDSEGMENT(SVRSMS);
          BEGINSEGMENT(SVRFSS)
ENTER FSS;
GET SUFFIX LIST ENTRY PARAMETERS;
IF
THIS IS NOT A DO-NOT-PROCESS SUFFIX
THEN
CALL (SVRMSS)
TO CHECK FOR MULTIPLE VARIATIONS;
GET SUFFIX LIST ENTRY PARAMETERS;
THEN
FLAG AS ADD-LETTER-Y ROOT WORD;
ELSE
IF
LETTER E SHOULD BE ADDED TO ROOT
THEN
FLAG AS ADD-LETTER-E ROOT WORD;
ENDIF;
ENDIF;
GET SUFFIX LIST ENTRY DROP COUNT;
DECREMENT WORD LENGTH BY DROP COUNT;
GET SUFFIX LIST ENTRY ADD COUNT;
INCREMENT WORD LENGTH BY ADD COUNT;
ENDIF;
FLAG AS HAVING BEEN LIST MATCHED;
RETURN
(TO SVRSTS WITH STEMMED WORD);
ENDSEGMENT(SVRFSS);
          BEGINSEGMENT(SVRMSS)
ENTER MSS;
IF
SUFFIX LIST ENTRY MULTIPLE SUFFIX
VARIATION FLAG IS ON
THEN
IF
THIS IS THE SECOND TIME THIS LIST
ENTRY IS MATCHED TO CANDIDATE WORD
THEN
RESET SECOND-TIME-THROUGH FLAG;
POINT TO NEXT SUFFIX LIST ENTRY-
THE ALTERNATE SUFFIX VARIATION;
ELSE
FLAG AS FIRST-TIME-THROUGH ENTRY;
ENDIF;
ENDIF;
RETURN
(TO SVRFSS WITH SUFFIX LIST UPDATE);
ENDSEGMENT(SVRMSS);
```

OPERATION

Figure 2:
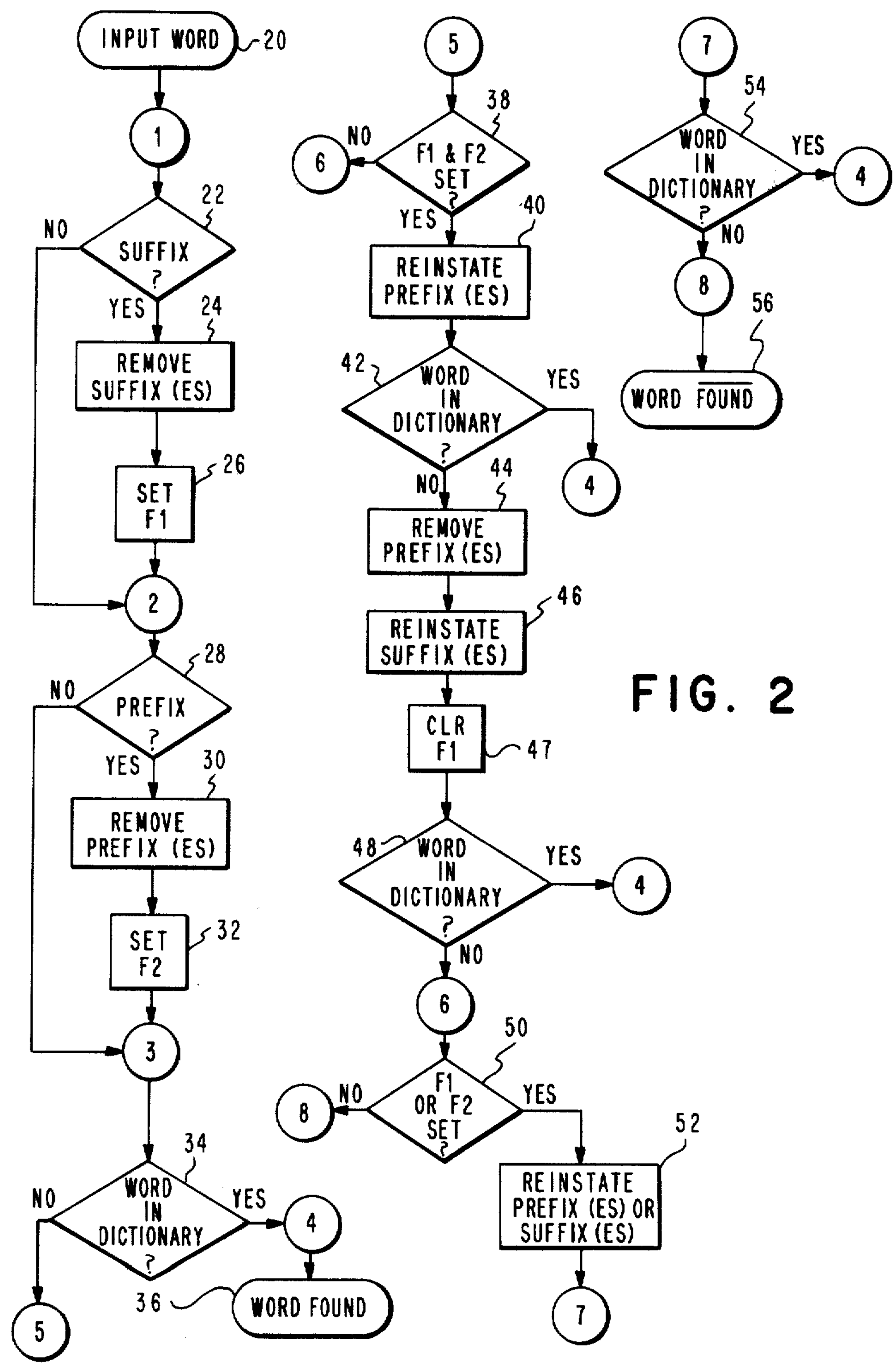
FIG. 2 is a flow chart of the operation of the stem processing system of this invention.

Referring now to FIG. 2 a flow diagram of the operation of the stem processing algorithm in the context of verifying the correctness of the spelling of an input word is shown. Table IX shows the main stem processing subroutine that controls testing of the input word to determine if it contains suffixes or prefixes that must be truncated. The stem processing subroutine provides for four possible passes of the input word through the processing routines to remove prefixes and suffixes. While the program routine provides for a separate pass to remove plurals, the plurals are treated as regular suffixes in the flow diagram of FIG. 2 for simplicity.

TABLE IX

Main Stem Processing Subroutine

```
          BEGINSEGMENT(SVRSCS)
ENTER SCS;
INITIALIZE PREFIX LENGTH FOR HYPHEN;
RESET SUFFIX ADD-E AND ADD-Y FLAGS;
CASENTRY(STEM PROCESSING CASE)
PASS 1 - SUFFIX/PREFIX PROCESSING;
PASS 2 - PLURAL/PREFIX PROCESSING;
PASS 3 - SUFFIX PROCESSING;
PASS 4 - PLURAL PROCESSING;
NOTE
PLURAL PROCESSING REFERS TO THE
STRIPPING OFF OF PLURALS FOR THE
SUFFIXES THAT ARE HANDLED BY THE
STEM PROCESSING ALGORITHM - I.E.,
---INGS BECOMES ---ING, ETC.;
CASE(1 - SUFFIX/PREFIX PROCESSING)
ATTEMPT SUFFIX/PREFIX REMOVAL;
CALL (SVRSPS)
TO SUFFIX PROCESS THE WORD;
CALL (SVRPPS)
TO PREFIX PROCESS THE WORD;
NOTE
THE FOLLOWING TESTS ARE DESIGNED
TO ALLOW THE WORD TO FOLLOW THE
SHORTEST PATH THROUGH THE CASES
DURING VERIFICATION;
IF
NO PREFIX AND NO SUFFIX PROCESSED
THEN
INCREMENT CASE NUMBER BY THREE;
ELSE
IF
ONLY ONE RULE PROCESSED
THEN
INCREMENT CASE NUMBER BY TWO;
ENDIF;
ENDIF:
CASE(2 - PLURAL/PREFIX PROCESSING)
ATTEMPT PLURAL/PREFIX REMOVAL;
CALL (SVRSSS)
TO PLURAL PROCESS THE WORD;
CALL (SVRPPS)
TO PREFIX PROCESS THE WORD;
CASE(3 - SUFFIX PROCESSING)
ATTEMPT SUFFIX REMOVAL;
CALL (SVRSPS)
TO SUFFIX PROCESS THE WORD;
CASE(4 - PLURAL PROCESSING)
ATTEMPT PLURAL REMOVAL;
CALL (SVRSSS)
TO PLURAL PROCESS THE WORD;
ENDCASE;
RETURN
```

TABLE IX-continued

| Main Stem Processing Subroutine |
| --- |
| (TO SVRAHAS WITH PROCESSED WORD); ENDSEGMENT(SVRSCS); |

The input word 20 is tested at block 22 by processor 10 under control of the suffix preprocessor subroutine listed in Table IV to determine if the input word contains a suffix. The suffix preprocessor subroutine is branched to as part of Case 1 processing under the main stem processing routine of Table IX. If a suffix equal to one of the defined legal suffixes of Table V is found, it is removed at block 24 under the control of the appropriate subroutine listed in Table VI. If the suffix is removable, the word end is reconstructed using the reconstruction rules listed in Table VII under the control of the program subroutines listed in Table VIII. A flag F1 is then set at block 26 to indicate that the suffixes have been processed.

Following suffix processing, or if no suffix is determined to exist, a branch is taken to connector 2 wherein the input word is tested at block 28 to determine if it contains a prefix. The prefix preprocessor subroutine tests the word to determine if it contains a sufficient number of characters to have a legal prefix. The legal prefix check subroutine listed in Table III tests to determine if one of the legal prefixes listed in Table I and stored in the prefix/suffix memory 12 matches the beginning characters of the word and adjusts the beginning address of the word to remove the prefix characters at block 30 if a match occurs. A flag is set at F2 in block 32 to indicate that prefix processing has occurred.

Following prefix processing, or if no legal prefix is found to exist in the word, the input word is compared to the contents of dictionary memory 12A at block 34. During suffix processing and prefix processing as described above, legal prefixes and suffixes are truncated from the input word. The dictionary memory 12A then contains only stem words, that is, words having no prefixes or suffixes. This significantly reduces the amount of storage required to hold the dictionary by eliminating the need to store multiple versions of the same word.

The words stored in the dictionary may be represented by bytes having a fixed number of bits for each character or by some form of data compaction such as run-length encoding or Huffman coding. In the preferred embodiment of this invention, however, the words are stored in the dictionary in the form of the vector representation disclosed in U.S. Pat. No. 3,995,254, entitled "Digital Reference Matrix For Word Verification", filed July 16, 1975 and issued Nov. 30, 1976 to Walter Steven Rosenbaum and assigned to the same assignee as the present application. If the input word matches an entry in the dictionary memory 12A then a signal is produced by the processor 10 into output register 18 to indicate that the input word is correctly spelled.

Following the attempt to match the input word to the contents of the dictionary memory, if no match occurs, a check is made to determine if flags F1 and F2 are set at block 38. If both flags F1 and F2 are set, then at block 40 the removed prefix is reinstated to the input word. The input word with the prefix reinstated is compared to the contents of the dictionary memory at block 42. If the word is found to be in the dictionary at block 42, a signal is produced at register 18 to so indicate through connector 4. However if the word is not found to be in the dictionary memory 12A, the prefix is once again removed at block 44 and the removed suffix(es) is reinstated at block 46. The input word now having a suffix and no prefix is compared to the contents of the dictionary memory 12A at block 48. If a match occurs the signal is produced at output register 18 as previously described. If no match occurs, or if the input word had only a prefix or a suffix, a check is made at block 50 to determine if either F1 or F2 is set. In any case, only F1 or F2 will be set since F1 was cleared at block 47 following reinstatement of the suffix. If processing had continued through block 40–48 then only F2 would be set and the prefix would be reinstated at block 52. The reinstatement of the prefix at block 52 would enable a test at block 54 of the entire word including prefix and suffix to determine if it is in the dictionary memory 12A at block 54. If the word does compare equal to an entry in the dictionary memory 12A, then the signal indicating a match is output to register 18. If block 50 had been branched to from block 38, the indication at 50 would be that only F1 or F2 was set. At block 52 the appropriate prefix or suffix would be reinstated and the contents of the dictionary memory 12A would be tested at block 54. If neither flag F1 nor F2 were set at block 50 or if the test at block 54 came up negative then an indication would be output by processor 10 to output register 18 indicating that the word is not found in the dictionary memory 12A, and consequently may not be correctly spelled. Reinstatement of the prefix and/or suffix to the input word may be accomplished by readjusting the start and end addresses for the word following an unsuccessful attempt to verify the word or by maintaining two registers one of which contains an unmodified version of the word. The main stem processing routine listed in Table IX executes each of the passes 1–4 using combinations of the prefix and suffix as shown in the flow diagram of FIG. 2 in attempting to verify whether the input word is spelled correctly.

While this invention has been described with reference to a specific set of computer instructions and with respect to a specified list of defined legal prefixes and suffixes, it will be understood by those skilled in the art that the spirit of this invention can be implemented in other computer languages and that the list of legal prefixes and suffixes may be modified without avoiding the scope of the invention claimed herein. The preferred embodiment of the invention has been described using an application to the English language. However, the described technique is equally applicable to many other languages. Furthermore, while the preferred embodiment of this invention has been shown and described as a number of programs for controlling a general purpose processor, it is well recognized that the invention could be implemented as a special purpose processor utilizing microcode to perform the same functions.

What is claimed is:

1. A method for minimizing the number of data segments in a dictionary storage file comprising the steps of:

(a) defining a set of prefix data segments;

(b) defining a set of suffix data segments;

(c) defining a minimum length for input data segments;

(d) receiving an input data segment;

(e) testing said input data segment for minimum length plus suffix length;

(f) comparing the low order characters of said input data segment to each suffix data segment in said set of suffix data segments when said input data segment length is at least equal to the minimum length plus the suffix length;

(g) truncating said input data segment to remove said low order characters that compare equal to one of said suffix data segments;

(h) testing said input data segment for minimum length plus prefix length;

(i) comparing the high order characters of said input data segment to each prefix data segment in said set of prefix data segments when said input data segment length is at least equal to the minimum length plus the prefix length;

(j) truncating said input data segment to remove said high order characters that compare equal to one of said prefix data segments;

(k) comparing the truncated input data segments to the contents of said dictionary storage file; and (l) storing said truncated input data segment in said dictionary storage file when said compare is unequal.

2. A method for detecting erroneous data segments in a number of data segments comprising the steps of:

(a) defining a set of prefix and suffix data segments; p1

(b) defining a minimum length for input data segments;

(c) receiving an input data segment;

(d) comparing said prefix and suffix data segments, respectively, to the high order and low order characters of said input data segment;

(e) truncating said input data segment to remove said high order and low order characters from said input data segment when the compare is equal;

(f) comparing said truncated input data segment with a list of valid data segments when said truncated input data is at least equal in length to defined minimum length; and (g) indicating said input data segment is erroneous when said truncated input data segments does not compare equal to one of said data segments in said list of valid data segments.

3. The method of claim 2 wherein truncating said input data segments to remove the low order characters includes replacing the low order characters of the input data segment with predefined ending characters associated with the suffix data segment.

4. A method for detecting erroneous data segments in a number of data segments comprising the steps of:

(a) defining a set of prefix data segments;

(b) defining a minimum length for input data segments;

(c) receiving an input data segment;

(d) comparing said input data segment to said set of valid prefix data segments;

(e) truncating said input data segment to remove those characters that compare equal to one of said prefix data segments;

(f) comparing the truncated input data segments to a dictionary storage file of valid data segments when the truncated input data segment is at least equal in length to the defined minimum length; and (g) indicating that said truncated data segment is erroneous when it does not compare equal to one of said valid data segments in said storage file.

5. A method for detecting erroneous data segments in a number of data segments comprising the steps of:

(a) defining a minimum length for input data segments;

(b) receiving an input data segment;

(c) testing said input data segment for minimum length plus suffix length;

(d) comparing the input data segment to a predefined list of valid suffix data segments when said input data segment length is at least equal to the minimum length plus suffix length;

(e) truncating said input data segment to remove the characters that compare equal to one of said valid suffix data segments;

(f) reconstructing the low order positions of said input data segment to replace the truncated characters with predefined ending characters associated with the suffix data segment;

(g) comparing said input data segment to a list of valid data segments; and (h) indicating said input data segment is erroneous when it does not compare equal to one of said valid data segments.

6. A system for minimizing the number of data segments in a dictionary storage file comprising:

means for storing a plurality of suffix and prefix data segments;

means for storing a minimum length for input data segments;

a memory;

an input register for receiving an input data segment to be stored in said memory;

means for comparing the high order positions of said input data segment to said prefix data segments;

means for comparing the number of characters in said input data segment to said minimum length plus the number of characters in the prefix data segment;

means for truncating said input data segment to deleted the group of characters from said input data segment that compare equal to one of said prefix data segments when said input data segment is at least equal to the minimum length plus the prefix length;

means for comparing the low order positions of said input data segment to said suffix data segments;

means for comparing the number of characters in said input data segment to said minimum length plus the number of characters in the suffix data segment;

means for truncating said input data segment to delete the group of characters that compare equal to one of said suffix data segments when said input data segment is at least equal to the minimum length plus the suffix length;

means for comparing the truncated input data segment to the contents of said memory; and means for storing said truncated input data segment in said memory when the compare is unequal.

7. The system of claim 6 further including means connected to said means for truncating the characters equal to said one suffix data segment for reconstructing the low order positions of the input data segment to replace the truncated characters with predefined ending characters associated with the suffix data segment.

8. A system for detecting erroneous data segments in a plurality of data segments comprising:

means for receiving an input data segment;

means for comparing the low order positions of said input data segments with a list of valid suffix data segments;

means for comparing the character count of said input data segment to a predefined minimum length plus the suffix length;

means for truncating the low order positions of said input data segment that compare equal to one of said valid suffix data segments when said input data segment is at least equal in length to said minimum length plus the suffix data segment length;

means for comparing the high order positions of said input data segments with a list of valid prefix data segments;

means for comparing the character count of said input data segment to a predefined minimum length plus the prefix length;

means for truncating the high order positions of the input data segment that compare equal to one of said valid prefix data segments when said input data segment is at least equal in length to said minimum length plus the prefix length;

means for comparing the truncated input data segment to a list of valid data segments; and means for indicating said truncated input data segment is erroneous when it fails to compare equal to one of said valid data segments.

9. The system of claim 8 wherein said means for truncating the low order positions of said input data segment includes means for reinstating the truncated low order positions to the input data segment when the truncated input data segment does not compare equal to one of said valid data segments.

10. The system of claims 8 or 9 wherein said means for truncating the high order positions of the input data segment includes means for reinstating the the truncated high order positions to the input data segment when the truncated input data segment does not compare equal to one of said valid data segments.

11. The system of claims 8, or 9 wherein said means for truncating the lower order positions of said input data segment further includes means for replacing the lower order positions of the input data segment with predefined ending characters associated with the suffix data segment.

* * * * *